(12) United States Patent
Kowalevicz (10) Patent No.: US 10,205,526 B2
(45) Date of Patent: Feb. 12, 2019

(54) METHODS AND SYSTEMS FOR REDUCING NOISE IN OPTOELECTRONIC OSCILLATORS

(71) Applicant: RAYTHEON COMPANY, Waltham, MA (US)

(72) Inventor: Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/857,141

(22) Filed: Dec. 28, 2017

(65) Prior Publication Data

US 2018/0145760 A1    May 24, 2018

Related U.S. Application Data

(62) Division of application No. 14/996,830, filed on Jan. 15, 2016, now Pat. No. 9,887,779.

(Continued)

(51) Int. Cl.
| | |
|---|---|
| *H04B 10/50* | (2013.01) |
| *H04B 10/2575* | (2013.01) |
| *H04B 10/00* | (2013.01) |

(52) U.S. Cl.
CPC ....... *H04B 10/50572* (2013.01); *H04B 10/00* (2013.01); *H04B 10/2575* (2013.01); *H04B 2210/006* (2013.01)

(58) Field of Classification Search
CPC .............................................. H04B 2010/006
See application file for complete search history.

(56) References Cited

U.S. PATENT DOCUMENTS

| | | | |
|---|---|---|---|
| 6,996,136 B1 * | 2/2006 | Carruthers | ............. H01S 3/067 372/106 |
| 7,492,795 B1 | 2/2009 | Delfyett et al. | |

(Continued)

FOREIGN PATENT DOCUMENTS

CN         203631957 U     6/2014

OTHER PUBLICATIONS

Droste et al.,"Optical-Frequency Transfer over a Single-Span 1840 km Fiber Link", American Physical Society, Physical Review Letters, Sep. 13, 2013, pp. 110801-1 to 110801-5.

(Continued)

*Primary Examiner* — Casey Kretzer
(74) *Attorney, Agent, or Firm* — Lando & Anastasi, LLP (57) ABSTRACT

Optoelectronic oscillator systems and an optoelectronic oscillator noise reduction method. One example of an optoelectronic oscillator system includes an optical source positioned at a first end of a fiber-optic path, the optical source being configured to transmit an optical signal along the fiber-optic path, an optical modulator positioned to receive and modulate the optical signal based on at least a reference signal, a retro-reflector positioned at a second end of the fiber-optic path, the retro-reflector being configured to receive and retro-reflect the optical signal, the retro-reflected optical signal having at least a frequency range of inherent fiber noise canceled, and an optical circulator positioned along the fiber-optic path between the optical modulator and the retro-reflector, the optical circulator being configured to direct the optical signal to the retro-reflector and direct the retro-reflected optical signal along a feedback path to a first photodetector to generate the reference signal.

18 Claims, 4 Drawing Sheets

Related U.S. Application Data (60) Provisional application No. 62/103,691, filed on Jan. 15, 2015.

(56) References Cited

U.S. PATENT DOCUMENTS

| | | | |
|---|---|---|---|
| 2005/0007642 A1* | 1/2005 | McGhan | G02F 1/225 359/237 |
| 2006/0109476 A1 | 5/2006 | Werner et al. | |
| 2010/0208270 A1 | 8/2010 | Kulkarni et al. | |
| 2010/0254715 A1 | 10/2010 | Yamashita et al. | |
| 2012/0294621 A1* | 11/2012 | Mazzochette | H04B 10/2575 398/115 |

OTHER PUBLICATIONS

Docherty et al., "Rayleigh-Scattering-Induced Rin and Amplitude-to-Phase Conversion as a Source of Length-Dependent Phase Noise in OEOs", IEEE Photonics Journal, vol. 5, No. 2, Apr. 2013, pp. 1-15.

Calonico et al., "High Accuracy Coherent Optical Frequency Transfer over a doubled 642km Fiber Link", Applied Physics B, vol. 117, No. 3, Nov. 2014, pp. 979-986.

Okusaga et al., "Suppression of Rayleigh-Scattering-Induced Noice in OEOs", Optics Express, vol. 21, No. 19, Sep. 13, 2013, pp. 22255-22262.

International Search Report and Written Opinion for PCT/US2016/013696 dated Apr. 1, 2016.

* cited by examiner

METHODS AND SYSTEMS FOR REDUCING NOISE IN OPTOELECTRONIC OSCILLATORS

RELATED APPLICATIONS

This application claims priority under 35 U.S.C. § 121 as a division of U.S. patent application Ser. No. 14/996,830, titled "METHODS AND SYSTEMS FOR REDUCING NOISE IN OPTOELECTRONIC OSCILLATORS," filed on Jan. 15, 2016, which claims priority under 35 U.S.C. § 119(e) to U.S. Provisional Application Ser. No. 62/103,691, titled "METHODS AND APPARATUS FOR REDUCING NOISE IN OPTOELECTRONIC OSCILLATORS," filed on Jan. 15, 2015, each of which is hereby incorporated herein by reference in its entirety.

BACKGROUND

Optoelectronic oscillators (OEOs) are high-frequency radio frequency (RF) sources with very low phase noise. Unfortunately, conventional architectures still suffer from some phase noise, which reduces the overall spectral purity of the source. The two basic sources of noise in optoelectronic oscillators include fiber dependent amplitude noise from Rayleigh and Brilloin scattering, which is converted to phase noise during photo-detection processes, and phase noise induced from environmental conditions. Several and ongoing attempts have been made to eliminate these sources of noise in optoelectronic oscillators. These include, for example, optical and electronic filtering and laser frequency modulation. Additional attempts to reduce noise have included approaches for suppressing amplitude to phase conversions during photo-detection processes.

SUMMARY OF THE INVENTION

Aspects and embodiments are directed to systems for reducing noise in optoelectronic oscillators, and methods of using the same. Certain examples involve the implementation of a double pass configuration optoelectronic oscillator system, which may include optical circulators, retro-reflectors, couplers, or other similarly functioning elements. These examples allow for inherent fiber noise cancellation through active, or passive, approaches. Additional components and devices, such as amplifiers, modulators, phase shifters, and optical filters, may be included to further reduce inherent fiber noise and allow an increased fiber-optic path length while maintaining a low close-in phase noise.

At least one aspect is directed to an optoelectronic oscillator system. In one embodiment, the optoelectronic oscillator system includes an optical source positioned at a first end of a fiber-optic path, the optical source being configured to transmit an optical signal along the fiber-optic path, an optical modulator positioned to receive the optical signal from the optical source and modulate the optical signal based on at least a received reference signal, a retro-reflector positioned at a second end of the fiber-optic path, the retro-reflector being configured to receive and retro-reflect the optical signal along the fiber-optic path, the retro-reflected optical signal having at least a frequency range of inherent fiber noise canceled, and an optical circulator positioned along the fiber-optic path and interposed between the optical modulator and the retro-reflector, the optical circulator being configured to direct the optical signal to the retro-reflector and direct the retro-reflected optical signal along a feedback path to a first photodetector to generate the reference signal.

According to an embodiment, the optoelectronic oscillator system further includes an optical component positioned along the fiber-optic path and interposed between the retro-reflector and the optical circulator, and an electrical component positioned along the feedback path and interposed between the first photodetector and the optical modulator, and at least one of the optical component and the electrical component includes one of an amplifier, a filter, an additional modulator, and a phase shifter. In a further embodiment, the optoelectronic oscillator system further includes a second photodetector interposed between the optical modulator and the electrical component. In one embodiment, the electrical component is configured to receive an output from the second photodetector, receive the reference signal from the first photodetector, and transmit a control signal to the optical component to cancel the frequency range of inherent fiber noise in the retro-reflected optical signal.

In one embodiment, the optoelectronic oscillator system further includes a fiber link delay positioned along the fiber-optic path and interposed between the retro-reflector and the optical component, and the fiber link delay has a length of substantially 10 km. In an embodiment, the fiber link delay includes a single optical fiber link.

According to one embodiment, the retro-reflector is configured cancel the frequency range of inherent fiber noise by retro-reflecting the optical signal. In an embodiment, the retro-reflector includes a phase conjugate mirror.

According to an aspect, provided is an optoelectronic oscillator system. In one embodiment, the optoelectronic oscillator system includes a first optical source positioned at a first end of a fiber-optic path and optically coupled to a first optical modulator, the first optical source being configured to transmit a first optical signal along the fiber-optic path, a second optical source positioned at a second end of the fiber-optic path and optically coupled to a second optical modulator, the second optical source being configured to transmit a second optical signal along the fiber-optic path, and the second modulator being configured to cancel at least a first frequency range of noise in the second optical signal, a fiber link delay positioned along the fiber-optic path and interposed between the first optical modulator and the second optical modulator, and a first optical circulator positioned along the fiber-optic path and interposed between the first optical modulator and the fiber link delay, the first optical circulator being configured to receive the second optical signal from the second optical modulator and direct the second optical signal along a first feedback path to a first photodetector to generate a first reference signal.

In one embodiment, optoelectronic oscillator system further includes a second optical circulator positioned along the fiber-optic path and interposed between the second optical modulator and the fiber link delay, the second optical circulator being configured to receive the first optical signal from the first optical modulator and the fiber link delay and direct the first optical signal along a second feedback path to a second photodetector to provide a second reference signal.

According to an embodiment, the optoelectronic oscillator system further includes a first optical component positioned along the fiber-optic path and interposed between the first optical circulator and the fiber link delay, and a second optical component positioned along the fiber-optic path and interposed between the second optical circulator and the fiber link delay. In one embodiment, the optoelectronic oscillator system further includes a first electrical component positioned along the first feedback path and interposed between the first photodetector and the first optical modulator, and a second electrical component positioned along the second feedback path and interposed between the second photodetector and the second optical modulator, and at least one of the first electrical component, the second electrical component, the first optical component, and the second optical component, includes one of an amplifier, a filter, an additional modulator, and a phase shifter.

According to one embodiment, the optoelectronic oscillator system further includes a third photodetector interposed between the first optical modulator and the first electrical component, and a fourth photodetector interposed between the second optical modulator and the second electrical component. In an embodiment, the first electrical component is configured to receive an output from the third photodetector, receive the first reference signal from the first photodetector, and transmit a control signal to the first optical circulator to cancel at least a second frequency range of the noise in the second optical signal. In one embodiment, the fiber link delay includes a single optical fiber link having a length of substantially 10 km. According to an embodiment, the second optical modulator is configured to receive the second reference signal and amplitude modulate the second optical signal.

According to another aspect, provided is an optoelectronic oscillator noise reduction method. In one embodiment, the method includes transmitting an optical signal from an optical source positioned at a first end of a fiber-optic path along the fiber-optic path, modulating the optical signal with an optical modulator positioned to receive the optical signal along the fiber-optic path based on at least a reference signal, receiving and retro-reflecting the optical signal at a retro-reflector positioned at a second end of the fiber-optic path, the retro-reflected optical signal having at least a frequency range of inherent fiber noise canceled, and directing, with an optical circulator positioned along the fiber-optic path, the retro-reflected optical signal along a feedback path to a photodetector to generate the reference signal.

According to an embodiment, retro-reflecting the optical signal includes canceling the frequency range of inherent fiber noise in the retro-reflected optical signal. In an embodiment, the retro-reflector includes a phase conjugate mirror, and retro-reflecting the optical signal includes reversing a propagation direction of the optical signal.

In an embodiment, the method further includes receiving the optical signal at a second photodetector interposed between the optical modulator and an electrical component positioned in the feedback path, receiving the reference signal and an output of the second photodetector at the electrical component, and transmitting a control signal from the electrical component to an optical component positioned along the fiber-optic path to cancel the frequency range of inherent fiber noise in the retro-reflected optical signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an approach for reducing phase noise in optoelectronic oscillators. Certain examples involve the implementation of a double pass configuration optoelectronic oscillator system, which may include optical circulators, retro-reflectors, couplers, or other similarly functioning elements, positioned within a fiber-optic path of the system. These examples allow for inherent fiber noise cancellation through active, or passive, approaches. Additional components and devices, such as amplifiers, modulators, phase shifters, and optical filters, may be included to further reduce inherent fiber noise (and/or environmentally induced noise) and allow an increased fiber-optic path length, with a low close-in phase noise.

Oscillators with a high stability timing and low close-in phase noise are desired for numerous applications. Several devices and systems have been proposed for generating a reference oscillator with these characteristics. One such device includes an optoelectronic oscillator. Generally, an optoelectronic oscillator is an optical-electrical hybrid device that generates spectrally pure microwave and millimeter wave signals. Specifically, optoelectronic oscillators may include a laser and an optical modulator coupled by a fiber-optic delay line to a photodetector.

Figure 1:
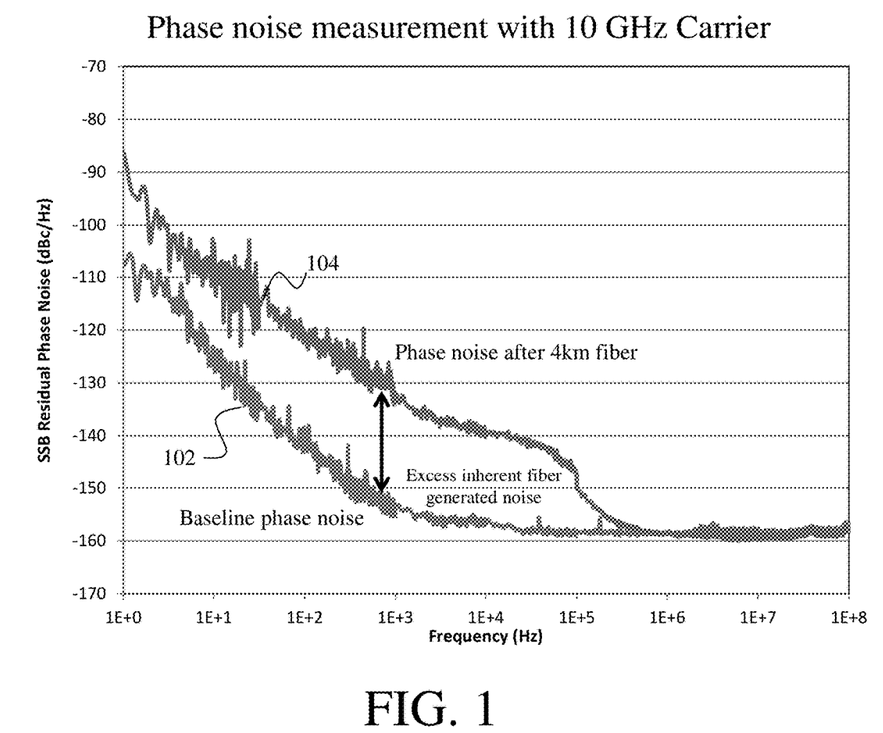
FIG. 1 is an example graphical illustration of the fiber induced residual phase noise in a 10 GHz carrier wave corresponding to a 4 km length of optical fiber.

While increasing the length of the fiber-optic delay line in conventional optoelectronic oscillators has been generally understood to increase the performance of the device by reducing the close-in phase noise, current research has shown that phase noise grows as the fiber length is increased (See, for example, Docherty et al., "Rayleigh-Scattering-Induced RIN and Amplitude-to-Phase Conversion as a Source of Length-Dependent Phase Noise in OEOs", *IEEE Photonics Journal*, Vol. 5, No. 2, April 2013, Pages 1-15). Specifically, Rayleigh and Brilloin scattering limits the performance of optoelectronic oscillators as fiber length is increased. For example, FIG. 1 illustrates an example of the increase in fiber induced phase noise in a 10 GHz carrier wave as the length of the optical fiber increases. A first trace 102 represents the base line phase noise of a low-phase noise source, and a second trace 104 represents the residual phase noise of the source after propagating through an optical fiber having a length of 4 km. As shown, increasing the length of the optical fiber by 4 km increases the phase noise by more than 20 dB for frequencies less than 10 kHz (i.e., the difference between the baseline noise and the phase noise represented by the second trace 104).

Double pass strategies have shown significant ability to reduce noise characteristics in optical-frequency transfer experiments (See, for example, DROSTE et al., "Optical-Frequency Transfer over a Single-Span 1840 km Fiber Link", American Physical Society, Physical Review Letters, Sep. 13, 2013, Pages 110801-1 to 110801-5). Aspects and embodiments discussed herein include an approach related to experiments tested on fiber-optic links of much greater length. In particular, aspects and embodiments discussed herein permit a larger bandwidth of phase noise cancellation than previously tested approaches (e.g., due to reduced fiber lengths), and in particular, permit the independent and individual correction and cancellation of effects from inherent fiber noise and environmentally induced fiber length fluctuations. As discussed herein, inherent fiber noise includes at least optical fiber-length-dependent flicker noise, such as noise from impurities in the optical fiber.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
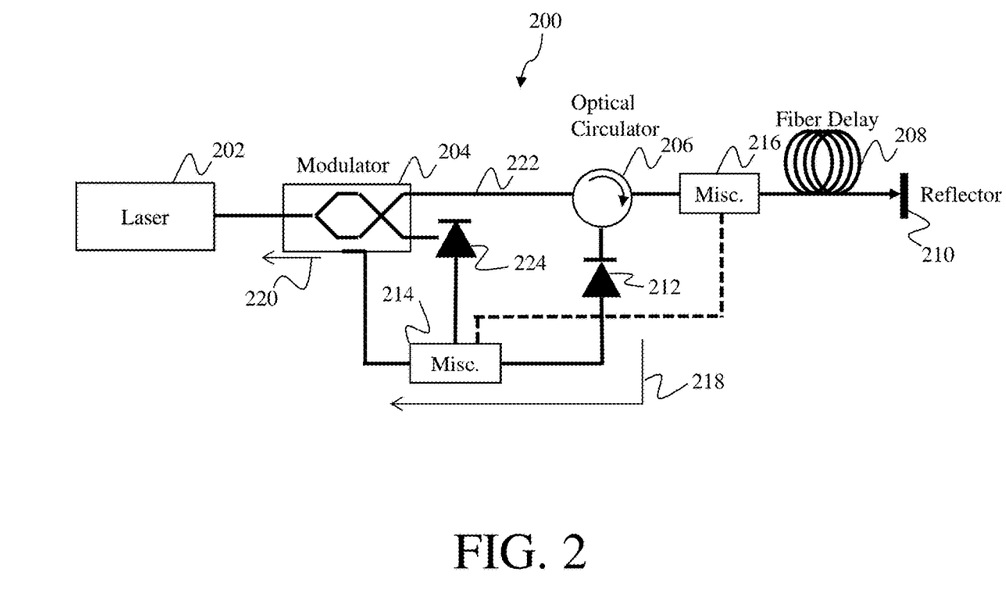
FIG. 2 is an example schematic architecture for an optoelectronic oscillator system with reduced phase noise, according to aspects of the present invention.
Figure 3:
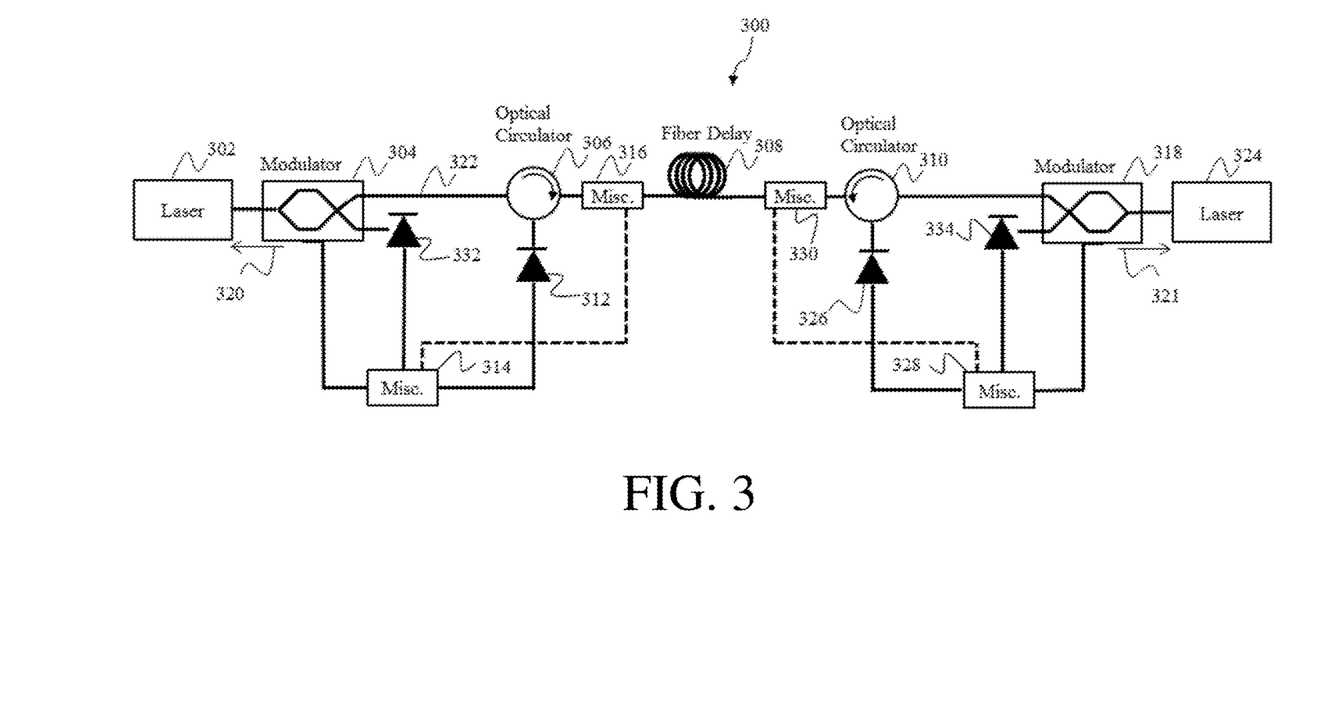
FIG. 3 is an example schematic architecture for an alternately coupled optoelectronic oscillator system, according to aspects of the present invention.

Some examples of architectures for an optoelectronic oscillator system with reduced phase noise are shown in FIG. 2 and FIG. 3. It is to be appreciated that these are not the only possible architectures, and that other components may be added and/or components may be removed to optimize performance. Turning to FIG. 2, the optoelectronic oscillator system 200 may include an optical source 202, an optical modulator 204, a retro-reflector 210, and an optical circulator 206, positioned along a fiber-optic path 222. As discussed herein, the optical system 200 may include an optical fiber extending the length of the fiber-optic path 222. The optical fiber may optically couple each component discussed herein as being positioned along the fiber-optic path 222. The system 200 may also include additional components, such as a first photodetector 212, a second photodetector 224, a fiber link delay 208, one or more optical component, one or more electrical component, and one or more interconnections between the various components of the system 200. In FIG. 2, the component blocks 214, 216 labeled "misc." refer to the one or more electrical component and one or more optical component, which may include a filter, combiner, amplifier, additional modulator, etc. In particular, the component block 214 refers to the one or more electrical component and the component block 216 refers to the one or more optical component.

According to certain embodiments, by utilizing one or more round-trips through the same fiber-optic path, active or passive techniques can be used to reduce the resultant phase noise and improve the performance of the optoelectronic oscillator system 200. Such techniques may be used alone, or as part of another combined approach to improve signal quality. In one example, the optical source 202 is positioned at a first end of the fiber-optic path 222, and configured to transmit an optical signal along the fiber-optic path 222 and in a direction of the optical modulator 204. The optical source 202 may include a fiber-coupled distributed feedback (DFB) laser, or a solid-state laser. As shown, the optical source 202 is in optical communication with the optical modulator 202. While in one embodiment, the optical source 202 may generate an optical signal having a wavelength within the spectrum of visible light, in various other embodiments, the optical source 202 may generate an optical signal of any other suitable wavelength of electromagnetic radiation. For example, in certain embodiments the optical source 202 may generate a near infrared (NIR) optical signal.

As FIG. 2 shows, the optical modulator 204 is positioned along the fiber-optic path 222 and aligned to receive the optical signal from the optical source 202. In certain embodiments, the optical signal includes a carrier wave, which the optical modulator 204 modulates based at least in part on a reference signal. For instance, the optical modulator 204 may include an electro-optic modulator configured to modulate an amplitude, phase, frequency, or polarization of the optical signal with an applied voltage or low-frequency electric field. In particular, the applied voltage or low-frequency electric field of the electro-optical modulator causes directional forces which distort a position, orientation, characteristic, or shape, of a material through which the optical signal is propagated. Controlled manipulation of the material adjusts a refractive index, and modulates the optical signal as specified by the reference signal.

As discussed in further detail below, after modulation by the optical modulator 204, the optical signal may be transmitted along the fiber-optic path 222 to the retro-reflector 210, retro-reflected by the retro-reflector 210, and received at the photodetector 212. The retro-reflected optical signal may then be used to generate the reference signal used to drive the optical modulator 204. Such an arrangement supports continuous and self-sustained oscillations of the optoelectronic oscillator system 200, and generation of a stable RF output.

In certain embodiments, the optical signal is transmitted along the fiber-optic path 222 from the optical modulator 204 to the optical circulator 206 before being received and retro-reflected at the retro-reflector 210. The optical circulator 206 is also positioned along the fiber-optic path 222 and configured to receive the optical signal, and direct the optical signal to the retro-reflector 210. In at least one example, the optical circulator 206 is configured to direct the optical signal based at least in part on a direction of propagation of the optical signal along the fiber-optic path 222. That is, the optical circulator 206 may be used to separate the optical signal received from the optical modulator 204 from a retro-reflection of the optical signal received from the retro-reflector 210.

In one example, the optical circulator 206 includes a first port in optical communication with the optical modulator 204 along the fiber-optic path 222, a second port in optical communication with the retro-reflector 210 along the fiber-optic path 222, and a third port in optical communication with the photodetector 212 along a feedback path. The feedback path is represented in FIG. 2 by arrow 218. Responsive to receiving the optical signal from the optical modulator 204, the optical circulator 206 is configured to direct the optical signal along the fiber-optic path 222, and in a direction of the retro-reflector 210. While discussed in one example as including an optical circulator, in various other embodiments the optical circulator 206 may include any other suitable optical device, such as a high precision device for optical rotation.

As FIG. 2 shows, after emission from the optical circulator 206 in the direction of the retro-reflector 210, the optical signal may be received and propagate along a fiber link delay 208 interposed between the optical circulator 206 and the retro-reflector 210. For example, the fiber link delay 208 may include a single optical fiber link. In particular, the fiber link delay 208 may have a length on the order of about 10 km. In various other embodiments, the fiber link delay 208 may have a length within a range of 1 m-100 km. In contrast to the double pass experiments discussed above, which were tested on systems having optical fiber lengths of up to 1840 km, the significantly shorter fiber link delays of the examples discussed herein allow a larger bandwidth of active stabilization, as well as inherent fiber noise correction based on individual measurements. That is, as a result of the large roundtrip time (source to destination and back) of the experiment optical systems, the bandwidth of noise correction within those tested systems is limited to noise on the order of tens or hundreds of Hertz (Hz). Such a limited bandwidth of noise correction undesirably restricts the noise correction performance of the system, and in particular, makes noise correction within the close-in phase noise region (i.e., frequencies within 100 kHz of the carrier wave frequency) challenging. The close-in phase noise region is principally important in numerous applications, such as advanced radar. In contrast, because the fiber delay link 208 of various embodiments has a much shorter length when compared to those of the tested systems, various embodiments permit noise correction beyond 10 kHz.

As shown, the retro-reflector 210 is positioned at a second end of the fiber-optic path 222 to receive the optical signal from the fiber link delay 208. In various embodiments, the retro-reflector 210 retro-reflects the received optical signal back along the fiber-optic path 222 to cancel at least a frequency range of noise (e.g., inherent fiber noise) in the retro-reflected signal. That is, the retro-reflector 210 may be positioned along the fiber-optic path 222 to reflect the optical signal back in a direction of the optical source 202 with minimum scattering and substantially the same amplitude. While in one embodiment, the retro-reflector 210 may include a Faraday mirror, in various other embodiments, the retro-reflector 210 may include any suitable passive retro-reflector configured to exactly reverse the propagation direction of the optical signal. In other embodiments, the retro-reflector 210 may include a phase conjugate mirror. Accordingly, in certain embodiments, the retro-reflected optical signal includes a conjugate beam of the optical signal, the conjugate beam having the inherent fiber noise from the fiber-optic path removed. While in one embodiment a particular frequency range of the inherent fiber noise may be canceled, in other embodiments, the entire range of inherent fiber noise may be canceled.

While discussed above as including a passive retro-reflector, such as a standard mirror, in various other implementations, the retro-reflector 210 shown in FIG. 2 may include an active retro-reflector. For example, an active retro-reflector may include a piezoelectric mounted optical device that can be manipulated based on a control signal received from other system components, such as the one or more electrical component shown as component block 214. In particular, the active retro-reflector may be systematically adjusted at a high frequency rate to cancel noise in the system 200 (e.g., environmental noise from fiber length changes).

While in one embodiment the retro-reflector 210 retro-reflects the received optical signal to directly cancel at least a particular frequency range of inherent fiber noise, in various other embodiments the retro-reflected optical signal may be used by other system components to cancel all (or a particular frequency range) of the inherent fiber noise. In other embodiments, the retro-reflector 210 may retro-reflect the optical signal to directly cancel a first frequency range of the inherent fiber noise, and the other system components may use the retro-reflected optical signal to cancel a remainder of the inherent fiber dependent, a second frequency range of the inherent fiber noise, or other noise within the system (e.g., environmentally induced noise). For example, other noise cancelling operations may be performed by the one or more electrical component (represented by component block 214) and/or the one or more optical component (represented by component block 216). Such embodiments are further discussed below.

The retro-reflected optical signal propagates through the fiber link delay 208 and along the fiber-optic path 222 in substantially an opposite direction of the propagating optical signal. The retro-reflected optical signal is received by the optical circulator 206, and directed along the feedback path to the first photodetector 212, as discussed above. As FIG. 2 shows, in certain examples, the feedback path includes an optical fiber coupled between the optical circulator 206 and the first photodetector 212, and an electrical connection between the first photodetector 212 and the optical modulator 204. In various embodiments, the optoelectronic oscillator system 200 further includes an output coupled within the feedback path and configured to provide a stabilized RF output signal. The output is represented in FIG. 2 by arrow 220.

In various embodiments, the first photodetector 212 is positioned along the feedback path and receives the retro-reflected optical signal from the optical circulator 206. Responsive to receiving the retro-reflected optical signal, the first photodetector 212 generates the reference signal to be provided to the optical modulator 204. The reference signal may be used by the optical modulator 204 as a reference to stabilize generated microwave or millimeter wave (RF) signals modulated onto the fiber-optic path 222. For example, the optical modulator 204 may adjust an amplitude, phase, frequency, or polarization, of the optical signal based on the reference signal. As FIG. 2 shows, in one example the first photodetector 212 includes a photo-diode configured to convert the retro-reflected optical signal into a corresponding current.

In certain embodiments the system 200 may include one or more electrical component and/or one or more optical component, such as the one or more electrical component represented by the component block 214 and the one or more optical component represented by component block 216. Electrical components and optical components may include any of an amplifier, a filter, a phase shifter, an additional modulator, or any other element suitable for optimizing noise cancellation performance. In particular, the one or more electrical component and/or optical component may cancel inherent fiber noise in the optical signal based at least in part on the retro-reflected optical signal.

For example, in certain embodiments the optical modulator 204 may be directly coupled via a second fiber-optic path to the second photodetector 224, which may also include a photo-diode (as shown in FIG. 2). Used in conjunction with the reference signal generated by the first photodiode 212 (based on the retro-reflection of the optical signal), an output of the second photodiode 224 may be used to stabilize the system 200, and cancel inherent fiber noise. In particular, an output of the second photodetector 224 may be coupled to the one or more electrical component represented by component block 214. Accordingly, the output from the second photodetector 224 may be received by the one or more electrical component and combined and/or compared with the reference signal to generate a correction signal, or adjust the reference signal being provided to the optical modulator 204.

In a particular example, the one or more optical component includes an additional modulator configured to receive the correction signal via an interconnection between the additional modulator and the one or more electrical component. Responsive to receiving the correction signal, the additional modulator modulates an amplitude, phase, frequency, or polarization, of the retro-reflected optical signal to cancel at least a frequency range of the inherent fiber noise in the retro-reflected optical signal. For instance, the additional modulator may include an acousto-optic modulator. However, in various other embodiments the additional modulator may cancel other noise in the system 200, such as at least a frequency range of environmentally induced noise. While discussed herein as performed by the one or more optical component (represented by component block 216), in various other embodiments, similar processes may be performed by the one or more electrical component (represented by component block 214) to cancel noise in the system 200. By such an arrangement, in-loop and out-of-loop corrections may be made to the amplitude and phase of the RF output signal generated by the optoelectronic oscillator system 200.

Electrical components may be controlled or implemented by a controller, for example. The controller may include a single controller; however, in various other embodiments the controller may consist of a plurality of controllers and/or control subsystems, which may include an external device, signal processing circuitry, or other control circuit. In particular, the controller may include analog processing circuitry (e.g., a microcontroller) and/or digital signal processing circuitry (e.g., a digital signal processor (DSP)). For instance, the microcontroller of various embodiments may include a processor core, memory, and programmable input/output components.

FIG. 3 shows an example architecture for an alternately coupled optoelectronic oscillator system 300 according to various aspects and embodiments. The optoelectronic oscillator system 300 of FIG. 3 may include many of the same components as included within the optoelectronic oscillator system 200 shown in FIG. 2. For example, a first optical source 302, a first optical modulator 304, a first optical circulator 306, a first photodetector 312, a third photodetector 332, first electrical components (shown as component block 314), and first optical components (shown as component block 316), may be the same as the optical source 202, the optical modulator 204, the optical circulator 206, the photodetectors 212, 224, and the one or more optical and electrical components discussed above with reference to at least FIG. 2, respectively. Similarly, a second optical source 324, a second optical modulator 318, a second optical circulator 310, a second photodetector 326, a fourth photodetector 334, second optical components (shown as component block 330), and second electrical components (shown as component block 328), may also be the same as the optical source 202, the optical modulator 204, the optical circulator 206, the photodetectors 212, 224, and the one or more optical and electrical components discussed above with reference to at least FIG. 2, respectively.

In various embodiments, the optoelectronic oscillator system 300 includes two opposed optoelectronic oscillator devices coupled along the same fiber-optic path 322. In certain embodiments, the two optoelectronic oscillator devices generate counter-propagating optical signals to be used to cancel noise in the system 300, and constructively reinforce the desired RF output signal. In particular, the optical signal from one optoelectronic oscillator may be used to generate reference signals for the optical modulator of the other optoelectronic oscillator device. As discussed above, the reference signals may then be used to stabilize the RF output signal from that optoelectronic oscillator.

In certain embodiments, the first optical source 302 is positioned at a first end of the fiber-optic path 322, and the second optical source 324 is positioned at a second end of the fiber-optic path 322. Each optical source 302, 324 is optically coupled to a corresponding optical modulator (i.e., the first optical modulator 304 and the second optical modulator 318). The first optical source 302 is positioned to generate and transmit a first optical signal along the fiber-optic path 322 to the first optical modulator 304. The first optical modulator 304 then receives the first optical signal, and modulates an amplitude, phase, frequency, or polarization, of the first optical signal, as discussed above with reference to the optical modulator 204 shown in FIG. 2. After modulation, the first optical signal is transmitted along the fiber-optic path 322 and directed by the first optical circulator 306 to the second optical circulator 310. As shown, the first optical signal propagates through the fiber link delay 308 interposed between the first optical circulator 306 and the second optical circulator 310 before being received by the second optical circulator 310.

Once received at the second optical circulator 310, the first optical signal is directed by the second optical circulator 310 along a feedback path of the second optoelectronic oscillator device (i.e., a second feedback path). The first optical signal is then received by the second photodetector 326 and a second reference signal for the second optical modulator 318 is generated. The second optical modulator 318 is configured to receive the second reference signal from the second photodetector 326 (and second electrical components) and cancel at least a frequency range of noise in a second optical signal received from the second optical source 324. For example, the second optical modulator 318 may be configured to receive the second reference signal and amplitude modulate the second optical signal to cancel the noise from the fiber link delay 308 (e.g., inherent fiber noise). The second optical modulator 318 may then transmit the second optical signal along the fiber-optic path 322 in a reverse direction of the first optical signal. In the reverse direction, the propagation of the second optical signal is similar to that of the first optical signal. In various embodiments, the second optical circulator 310 is positioned to receive the second optical signal and direct the second optical signal to the first optical circulator 306.

After propagating through the fiber delay link 308, the second optical signal is received at the first optical circulator 306 and is directed to the first photodetector 312. The first photodetector 312 may then be configured to receive the second optical signal along the feedback path of the first optoelectronic oscillator, and generate a first reference signal to be provided to the first optical modulator 304 after passing through the first electrical components. In various embodiments, the first and second reference signals may include RF output signals to be provided to the outputs (shown as arrows 320 and 321) of the first and second optoelectronic oscillator devices. Accordingly, in various embodiments the second optical signal from the second optoelectronic oscillator may be used to correct for noise in the first optical signal, and may be used to drive the first optoelectronic oscillator. While described herein with reference to a single direction, in various other embodiments, such processes may be performed in the reverse direction, or progressively in both directions along the fiber-optic path 322 between the two optoelectronic oscillators.

In certain examples, the electrical components or optical components of the first and second optoelectronic oscillator devices may also cancel noise in the optical system 300 based at least in part on the first optical signal and/or the second optical signal. In one example, the first optical modulator 304 is directly coupled to the third photodetector 332, which may include a photo-diode (as shown in FIG. 3). The second optical modulator 318 may be similarly coupled to the fourth photodetector 334. Used in conjunction with the corresponding first reference signal generated by first photodetector 312, an output of the third photodetector 332 may be used to stabilize the system 300 and cancel noise, such as inherent fiber noise from the fiber link delay 308. In particular, an output of the third photodetector 332 may be coupled to the first electrical components (represented by component block 314). The output from the third photodetector 332 may be received by the first electrical components and combined and/or compared with the first reference signal to generate a correction signal, or adjust the first reference signal provided to the first optical modulator 304.

In one example, first optical components include an additional modulator configured to receive the correction signal via an interconnection between the additional modulator and the first electrical components. Responsive to receiving the correction signal, the additional modulator modulates an amplitude, phase, frequency, or polarization, of the second optical signal to cancel at least a frequency range of inherent fiber noise in the second optical signal. However, in various other embodiments the additional modulator may cancel other noise in the system 300, such as a least a frequency range of environmentally induced noise. While discussed herein as performed by the first optical components (represented by component block 316), in various other embodiments similar processes may be performed by the first electrical components (represented by component block 314). In various embodiments, the fourth photodetector 334, second optical components (represented by component block 330), and the second electrical components (represented by component block 328), and perform similar processes in the reverse direction.

As discussed above with reference to FIG. 2 and FIG. 3, several embodiments perform processes for reducing noise in optoelectronic oscillators. In particular, several embodiments perform processes for active or passive cancellation of noise, for example inherent fiber noise. In some embodiments, these processes are executed by an optoelectronic oscillator system, such as the system 200 described with reference to FIG. 2. One example of such a process is illustrated in the process flow shown in FIG. 4. According to this example, the process 400 may include the acts of transmitting an optical signal, modulating the optical signal, receiving and retro-reflecting the optical signal, directing the retro-reflected optical signal by an optical circulator, and providing an output signal.

Figure 4:
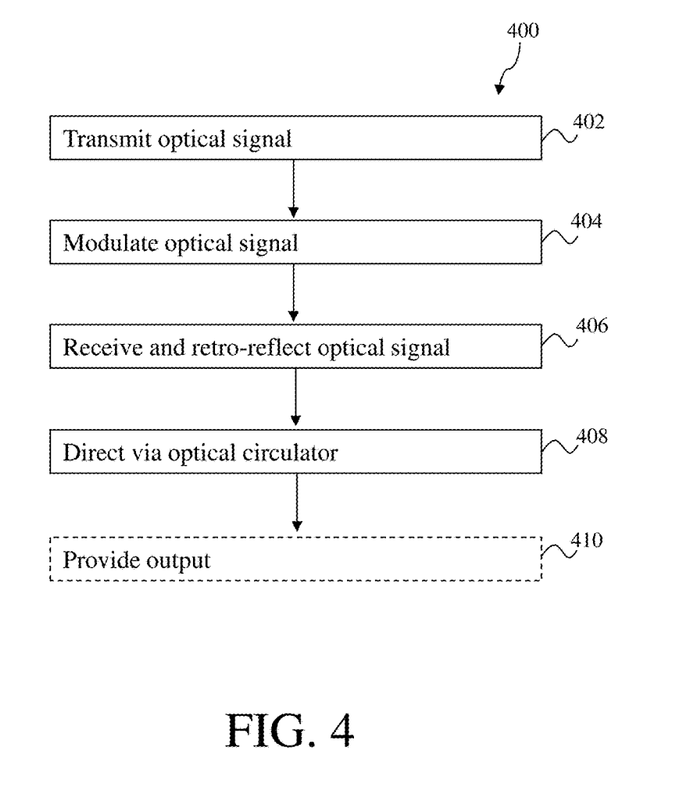
FIG. 4 is an example process flow for an optoelectronic oscillator noise reduction method, according to aspects of the present invention.

In act 402, the process 400 may include transmitting an optical signal along the fiber-optic path from an optical source positioned at the first end of the fiber-optic path. While in one embodiment, the process 400 may further include generating a continuous optical signal with a wavelength within the spectrum of visible light, in various other embodiments, the optical source may generate an optical signal of any other suitable wavelength of electromagnetic radiation. In response to transmitting the optical signal, the optical signal may be received at an optical modulator.

In various embodiments, act 404 includes modulating the received optical signal at the optical modulator based at least in part on a reference signal. As discussed with reference to the optical modulator 204 shown in FIG. 2, modulating the optical signal may include adjusting an amplitude, phase, frequency, or polarization, of the optical signal. In particular, the optical modulator may adjust one or more of these properties of the optical signal to stabilize and sustain an RF electro-optic oscillation.

Following modulation by the optical modulator, in act 406 the process 400 includes receiving and retro-reflecting the optical signal at a retro-reflector positioned at a second end of the fiber-optic path. In certain embodiments, the process 400 includes transmitting the optical signal along the fiber-optic path from the optical modulator to the optical circulator, before receiving the optical signal at the retro-reflector. As discussed above with reference to the optical circulator 206 shown in FIG. 2, the optical circulator may be positioned along the fiber-optic path and may perform processes for directing the optical signal based at least in part on a direction of propagation of the optical signal along the fiber-optic path. That is, the optical circulator may separate the optical signal received from an optical modulator from the retro-reflected of the optical signal received from the retro-reflector.

In certain embodiments, the process 400 may also include the act of propagating the optical signal along the fiber link delay before receiving the optical signal at the retro-reflector. Similarly, the process 400 may include the act of propagating the retro-reflected optical signal along the fiber link delay responsive to retro-reflecting the optical signal. While the length of the fiber link delay may be chosen based on the particular application of the optoelectronic oscillator system, as discussed above, in various embodiments the fiber link delay has a length on the order of 10 km, or within a range of 1 m-100 km.

Returning to act 406, in various embodiments the process 400 includes retro-reflecting the received optical signal back along the fiber-optic path and canceling at least a frequency range of inherent noise in the retro-reflected signal. That is, the process 400 may include retro-reflecting the optical signal back in a direction of the optical source with minimum scattering and substantially the same amplitude. While in one embodiment, the retro-reflector may include a Faraday mirror, in various other embodiments, the retro-reflector may include any suitable passive retro-reflector configured to exactly reverse the propagation direction of the optical signal. For example, the retro-reflector may include a phase conjugate mirror. Accordingly, in certain embodiments, retro-reflecting the optical signal may include reflecting a conjugate beam of the optical signal, the conjugate beam having inherent fiber noise from the fiber-optic path canceled. While in one embodiment a particular frequency range of inherent fiber noise may be canceled, in other embodiments, the entire range of inherent fiber noise may be canceled.

In act 408, the process 400 may include directing, with the optical circulator positioned along the fiber-optic path, the retro-reflected optical signal along a feedback path to a photodetector to generate the reference signal. In act 410, the process 400 may then optionally include providing a stabilized RF output signal, which may include, for example, the reference signal. As discussed herein, the reference signal may be used by the optical modulator to adjust the properties (i.e., phase, frequency, amplitude, or polarization) of the optical signal.

In certain other embodiments, the process 400 may further include the acts of receiving the optical signal at a second photodetector (e.g., the second photodetector 224 shown in FIG. 2), and generating a control signal to cancel inherent fiber noise in the retro-reflected optical signal, or other noise within the system. That is, while in one example retro-reflecting the optical signal may include canceling at least a frequency range of inherent fiber noise in the retro-reflected optical signal, in other examples other components of the system may cancel inherent fiber noise. For example, the process 400 may include receiving an output of the second photodetector at the one or more electrical components, and generating the control signal based on a combination or a comparison of the output from the second photodetector and the reference signal. In certain other embodiments, such processes may include adjusting the reference signal based on the combination or comparison.

In a particular example, the one or more optical component includes an additional modulator and the process includes modulating the retro-reflected optical signal to cancel inherent fiber noise responsive to receiving the control signal at the one or more optical component. While in one embodiment, modulating the retro-reflected optical signal may include modulating an amplitude of the retro-reflected optical signal, in various other embodiments, the process 400 may include the act of modulating a phase, frequency, or polarization of the retro-reflected optical signal at the one or more optical component. While discussed herein as performed by the one or more optical component, in various other embodiments the process 400 may include similar acts performed by the one or more electrical component.

Accordingly, aspects and embodiments are directed to systems for reducing noise in optoelectronic oscillators, and methods of using the same. Certain examples involve the implementation of a double pass configuration optoelectronic oscillator system, which may include optical circulators, retro-reflectors, couplers, or other similarly functioning elements, in the fiber-optic path. These examples allow for the independent and individual correction and cancellation of effects from inherent fiber dependent noise and environmentally induced fiber length fluctuation through active, or passive, approaches. Additional improvements may also be achieved as a result of the proximity of components of the optoelectronic oscillator system of various embodiments. Because such embodiments are compact and do not require geographically dispersed components, embodiments may be environmentally stabilized in a compact package.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optoelectronic oscillator system comprising:
   a first optical source positioned at a first end of a fiber-optic path and configured to transmit a first optical signal along the fiber-optic path;
   a first optical modulator positioned along the fiber-optic path and configured to receive the first optical signal from the first optical source and to amplitude modulate the first optical signal based on a first reference signal;
   a second optical source positioned at a second end of the fiber-optic path and configured to transmit a second optical signal along the fiber-optic path, the first reference signal being derived from the second optical signal;
   a second optical modulator positioned along the fiber-optic path and configured to receive the second optical signal from the second optical source, the second modulator being configured to amplitude modulate the second optical signal based on a second reference signal to cancel at least a first frequency range of noise in the second optical signal, the second reference signal being derived from the first optical signal;
   a fiber link delay positioned along the fiber-optic path and interposed between the first optical modulator and the second optical modulator;
   a first optical circulator positioned along the fiber-optic path and interposed between the first optical modulator and the fiber link delay, the first optical circulator being configured to receive the second optical signal from the second optical modulator and direct the second optical signal along a first feedback path to a first photodetector to generate the first reference signal; and
   a second optical circulator positioned along the fiber-optic path and interposed between the second optical modulator and the fiber link delay, the second optical circulator being configured to receive the first optical signal from the first optical modulator and the fiber link delay and direct the first optical signal along a second feedback path to a second photodetector to provide the second reference signal.

2. The optoelectronic oscillator system according to claim 1, further comprising:
   a first optical component positioned along the fiber-optic path and interposed between the first optical circulator and the fiber link delay; and
   a second optical component positioned along the fiber-optic path and interposed between the second optical circulator and the fiber link delay.

3. The optoelectronic oscillator system according to claim 2, further comprising:
   a first electrical component positioned along the first feedback path and interposed between the first photodetector and the first optical modulator; and
   a second electrical component positioned along the second feedback path and interposed between the second photodetector and the second optical modulator,
   wherein at least one of the first electrical component, the second electrical component, the first optical component, and the second optical component, includes one of an amplifier, a filter, an additional modulator, and a phase shifter.

4. The optoelectronic oscillator system according to claim 3, further comprising:
a third photodetector interposed between the first optical modulator and the first electrical component; and
a fourth photodetector interposed between the second optical modulator and the second electrical component.

5. The optoelectronic oscillator system according to claim 4, wherein the first electrical component is configured to receive an output from the third photodetector, receive the first reference signal from the first photodetector, and transmit a control signal to the first optical component to cancel at least a second frequency range of the noise in the second optical signal.

6. The optoelectronic oscillator system according to claim 4, wherein the fiber link delay includes a single optical fiber link.

7. The optoelectronic oscillator system according to claim 4, wherein the fiber link delay has a length on the order of 10 km.

8. The optoelectronic oscillator system according to claim 1, wherein the first frequency range of noise in the second optical signal is a frequency range of inherent fiber noise.

9. The optoelectronic oscillator system according to claim 1, further comprising:
a first optical component positioned along the fiber-optic path and interposed between the first optical circulator and the fiber link delay;
a first electrical component positioned along the first feedback path and interposed between the first photodetector and the first optical modulator, wherein at least one of the first electrical component and the first optical component includes one of an amplifier, a filter, an additional modulator, and a phase shifter; and
another photodetector interposed between the first optical modulator and the first electric al component,
wherein the first electrical component is configured to receive an output from the another photodetector, receive the first reference signal from the first photodetector, and transmit a control signal to the first optical component to cancel at least a second frequency range of the noise in the second optical signal.

10. The optoelectronic oscillator system according to claim 9, wherein the fiber link delay includes a single optical fiber link.

11. The optoelectronic oscillator system according to claim 9, wherein the fiber link delay has a length on the order of 10 km.

12. The optoelectronic oscillator system according to claim 1, further comprising:
a third photodetector directly coupled to the first optical modulator; and
a first electrical component connected along the first feedback path between the first photodetector and the first optical modulator, the first electrical component being configured to receive an output signal from the third photodetector, to receive the first reference signal, and to generate a correction signal based on the first reference signal and the output signal from the third photodetector.

13. The optoelectronic oscillator system according to claim 12, further comprising an additional modulator positioned along the fiber-optic path between the first optical circulator and the fiber link delay and connected to the first electrical component, the additional modulator being configured to receive the correction signal and to modulate at least one of amplitude, phase, frequency, and polarization of the second optical signal to cancel a frequency range of inherent fiber noise in the second optical signal.

14. An optoelectronic oscillator noise reduction method, the method comprising:
transmitting a first optical signal from a first optical source positioned at a first end of a fiber-optic path along the fiber-optic path;
modulating the first optical signal with a first optical modulator positioned to receive the first optical signal along the fiber-optic path based on at least a first reference signal;
transmitting a second optical signal from a second optical source positioned at a second end of the fiber-optic path along the fiber-optic path;
amplitude modulating the second optical signal with a second optical modulator positioned to receive the second optical signal along the fiber-optic path based on at least a second reference signal to cancel at least a first frequency range of noise in the second optical signal;
directing, with a first optical circulator positioned along the fiber-optic path, the second optical signal along a first feedback path to a first photodetector to generate the first reference signal; and
directing, with a second optical circulator positioned along the fiber-optic path, the first optical signal along a second feedback path to a second photodetector to generate the second reference signal.

15. The method according to claim 14, wherein the first frequency range of noise in the second optical signal is a frequency range of inherent fiber noise.

16. The method according to claim 14, further comprising:
receiving an output of another photodetector interposed between the first optical modulator and a first electrical component positioned in the first feedback path, at the first electric al component;
receiving the first reference signal at the first electrical component;
generating a first control signal based on the output of the another photodetector and the first reference signal; and
transmitting the first control signal from the first electrical component to a first optical component positioned along the fiber-optic path to cancel a second frequency range of the noise in the second optical signal.

17. The method according to claim 14, wherein transmitting the first optical signal from the first optical source along the fiber-optic path includes transmitting the first optical signal along a fiber link delay having a length on the order of 10 km.

18. The method according to claim 14, wherein modulating the first optical signal includes amplitude modulating the first optical signal based on the first reference signal to cancel a first frequency range of noise in the first optical signal.

* * * * *

UNITED STATES PATENT AND TRADEMARK OFFICE
CERTIFICATE OF CORRECTION

PATENT NO. : 10,205,526 B2
APPLICATION NO. : 15/857141
DATED : February 12, 2019
INVENTOR(S) : Andrew Kowalevicz Page 1 of 1

It is certified that error appears in the above-identified patent and that said Letters Patent is hereby corrected as shown below:

In the Claims

Column 15, Line 35, delete "electric al" and insert -- electrical --.

Column 16, Line 42, delete "electric al" and insert -- electrical --.

Signed and Sealed this
Twentieth Day of August, 2019

Andrei Iancu
*Director of the United States Patent and Trademark Office*